(12) United States Patent
Singh et al.

(10) Patent No.: US 11,811,747 B2
(45) Date of Patent: Nov. 7, 2023

(54) METHODS, SYSTEMS, AND COMPUTER READABLE MEDIA FOR DELEGATED AUTHORIZATION AT SERVICE COMMUNICATION PROXY (SCP)

(71) Applicant: Oracle International Corporation, Redwood Shores, CA (US)

(72) Inventors: Virendra Singh, Bangalore (IN); Jay Rajput, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 252 days.

(21) Appl. No.: 17/198,815

(22) Filed: Mar. 11, 2021

(65) Prior Publication Data

US 2022/0294775 A1    Sep. 15, 2022

(51) Int. Cl.
*H04L 9/40*    (2022.01)

(52) U.S. Cl.
CPC ...... *H04L 63/0807* (2013.01); *H04L 63/0815* (2013.01); *H04L 63/0884* (2013.01)

(58) Field of Classification Search
CPC ............. H04L 63/0807; H04L 63/0815; H04L 63/0884; H04W 92/02; H04W 12/084
See application file for complete search history.

(56) References Cited

U.S. PATENT DOCUMENTS

| 2021/0297942 A1* | 9/2021 | S Bykampadi | ....... H04W 48/16 |
| 2022/0086734 A1* | 3/2022 | Aggarwal | ........... H04L 63/0807 |
| 2022/0201487 A1* | 6/2022 | Minokuchi | ............. H04W 8/12 |
| 2022/0295282 A1 | 9/2022 | Rajput et al. | |

FOREIGN PATENT DOCUMENTS

| EP | 3 955 515 A1 | 2/2022 |
| WO | WO 2020/208913 A1 | 10/2020 |
| WO | WO 2020/221956 A1 | 11/2020 |

(Continued)

OTHER PUBLICATIONS

Commonly-assigned, Co-pending U.S. Appl. No. 17/198,740 for "Methods, Systems, and Computer Readable Media for Delegated Authorization at Security Edge Protection Proxy (SEPP)." (Unpublished, filed March 11, 2021).

(Continued)

*Primary Examiner* — Amie C. Lin
(74) *Attorney, Agent, or Firm* — Jenkins, Taylor & Hunt P.A.

(57) ABSTRACT

A method for delegated authorization at a service communications proxy (SCP) includes intercepting, from a consumer network function (NF) that does not support access token based authorization, a service based interface (SBI) request. The method further includes operating as an access token authorization client to obtain a first access token on behalf of the consumer NF. The method further includes using the first access token to enable the consumer NF to access the service provided by a first producer NF that requires access-token-based authorization. The SCP may also function as an access token authorization server on behalf of an NRF that does not support access-token-based authorization.

18 Claims, 14 Drawing Sheets

(56) References Cited

FOREIGN PATENT DOCUMENTS

WO    WO 2022/191931 A1    9/2022

OTHER PUBLICATIONS

Notification of Transmittal of the International Search Report and the Written Opinion of the International Searching Authority, or the Declaration for International Application No. PCT/US2022/014087 (dated Apr. 14, 2022).

Notification of Transmittal of the International Search Report and the Written Opinion of the International Searching Authority, or the Declaration for International Application No. PCT/US2022/014084 (dated Apr. 14, 2022).

Commonly-assigned, Co-pending U.S. Appl. No. 17/198,740 for "Methods, Systems, and Computer Readable Media for Delegated Authorization at Security Edge Protection Proxy (SEPP)," (Unpubllshed filed Mar. 11, 2021)

Nokia et al., "Re-using of access token in indirect communication with delegated discovery," 3GPP TSG-SA3 Meeting#101-e, pp. 1-4 (Nov. 9, 2020 to Nov. 20, 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Technical Realization of Service Based Architecture; Stage 3 (Release 17)," 3GPP TS 29.500. V17.1.0. pp. 1-90 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Fielding et al., "Hypertext Transfer Protocol (HTTP/1.1): Semantics and Content," Internet Engineering Task Force (IETF), RFC 7231, pp. 1-102 (Jun. 2014).

Hardt, "The OAuth 2.0 Authorization Framework," Internet Engineering Task Force (IETF), RFC 6749, pp. 1-77 (Oct. 2012).

\* cited by examiner

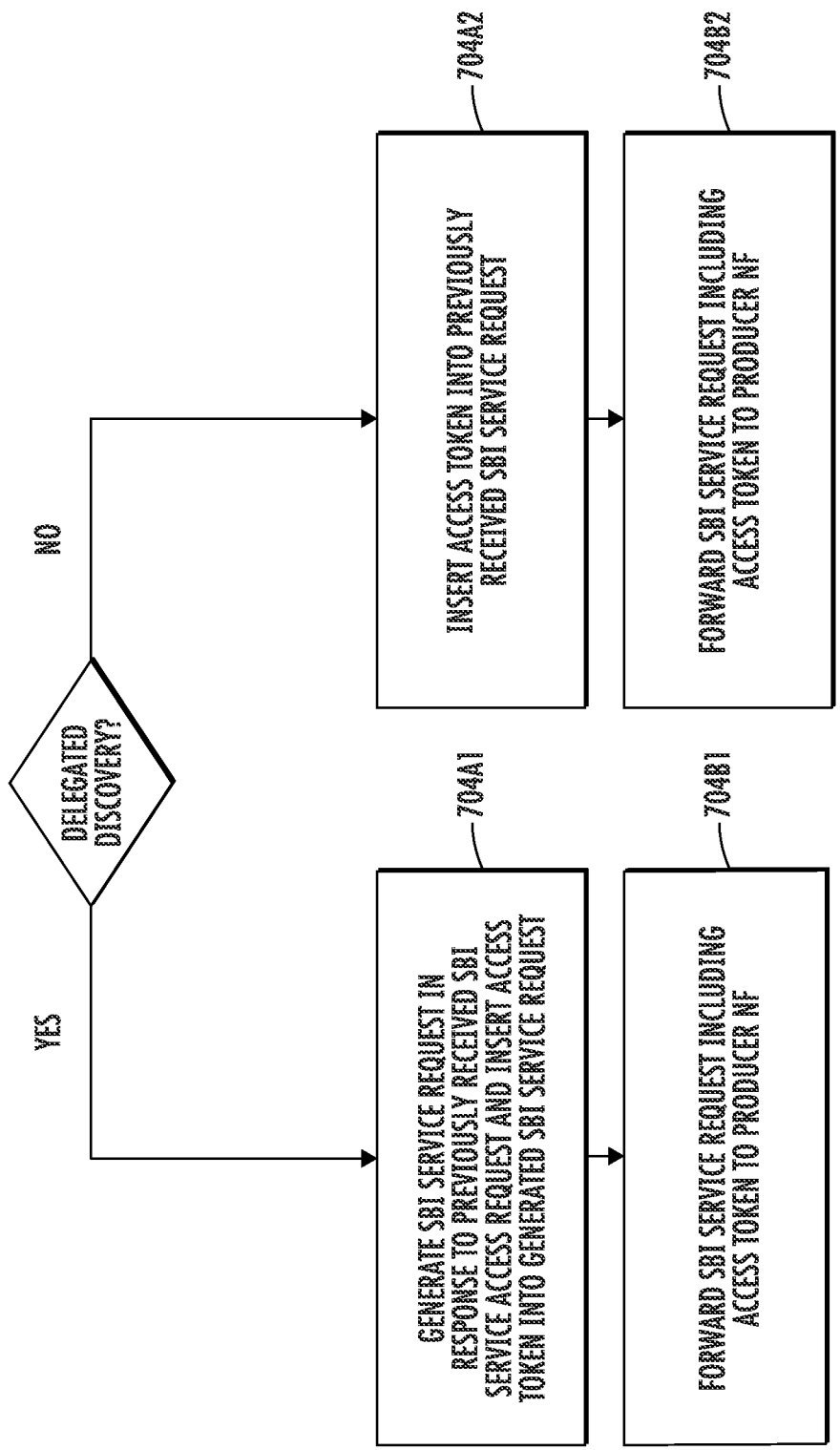

METHODS, SYSTEMS, AND COMPUTER READABLE MEDIA FOR DELEGATED AUTHORIZATION AT SERVICE COMMUNICATION PROXY (SCP)

TECHNICAL FIELD

The subject matter described herein relates to network security and inter-public land mobile network (PLMN) compatibility. More particularly, the subject matter described herein relates to methods, systems, and computer readable media for delegated authorization at an SCP.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks occurs when one PLMN or network function supports OAuth 2.0 authorization and another PLMN or network function does not support OAuth 2.0 authorization. According to the OAuth 2.0 authorization framework specified in Internet Engineering Task Force (IETF) request for comments (RFC) 6749, an authorization client seeking to access a protected resource available from a resource server first obtains an access token from an authorization server. After the client obtains the access token, the client sends a service request to the resource server. The resource server verifies the access token and provides access to the protected resource.

In the context of 5G communications networks, the NF service consumer functions as the OAuth 2.0 resource client, the NF service producer functions as the OAuth 2.0 resource server, and the NRF functions as the authorization server. Thus, an NF service consumer seeking to access a service provided by an NF service producer signals with the NRF to obtain an access token to access the resource provided by the NF service producer. After the NF service consumer obtains the access token from the NRF, the NF service consumer sends a service request to the NF service producer, where the service request includes the access token. The NF service producer validates the access token and provides access to the service requested by the NF service consumer.

While the OAuth 2.0 authorization framework works to provide authorization in 5G communications networks, if a service request is sent from a consumer NF that does not support OAuth 2.0 authorization to a producer NF that requires an OAuth 2.0 access token, the service request will be denied. Similarly, if a consumer NF that supports OAuth 2.0 authorization sends an access token request to an NRF that does not support OAuth 2.0 authorization, the requesting consumer NF will not be able to obtain an access token.

These types of incompatibility issues may occur when the PLMN of the service consumer supports OAuth 2.0 authorization, and the PLMN of the service producer does not support OAuth 2.0 authorization or vice-versa. These types of incompatibility issues may also occur when an NF from one vendor supports OAuth 2.0 authorization and an NF from another vendor does not support OAuth 2.0 authorization.

In light of these and other difficulties, there exists a need for a method for improved interoperability between network functions when an OAuth 2.0 authorization incompatibility exists.

SUMMARY

A method for delegated authorization at a service communication proxy (SCP) includes intercepting, from a first consumer network function (NF) that does not support access-token-based authorization, a service based interface (SBI) service request. The method further includes operating as an access token authorization client proxy to obtain a first access token on behalf of the first consumer NF. The method further includes using the first access token to enable the first consumer NF to access the service provided by a first producer NF that requires access-token-based authorization.

According to another aspect of the subject matter described herein, operating as an access token authorization client proxy includes signaling with an NF repository function (NRF) to obtain the first access token.

According to another aspect of the subject matter described herein, signaling with the NRF to obtain the first access token includes: generating an access token request on behalf of the first consumer NF; transmitting the access token request to the NRF; and receiving, from the NRF, an access token response including the first access token.

According to another aspect of the subject matter described herein, generating the access token request includes extracting values for at least some attributes to be included in the access token request from a user agent header of the SBI request.

According to another aspect of the subject matter described herein, extracting values for at least some of the attributes includes extracting an NF instance ID of the first consumer NF from the user agent header of the SBI request.

According to another aspect of the subject matter described herein, receiving an SBI request includes receiving an SBI service request from the first consumer NF and using the first access token to enable the first consumer NF to access the service provided by the first producer NF includes: inserting the first access token in the SBI service request; forwarding the SBI service request including the first access token to the first producer NF; receiving an SBI service response from the first producer NF; and forwarding the SBI service response to the first consumer NF.

According to another aspect of the subject matter described herein, receiving an SBI request includes receiving an SBI service access request from the first consumer NF and using the first access token to enable the first consumer NF to access the service provided by the first producer NF includes: generating an SBI service request based on delegated discovery and NF selection performed in response to the SBI service access request; inserting the first access token in the SBI service request; forwarding the SBI service request including the first access token to the first producer NF; receiving an SBI service response from the first producer NF; and forwarding the SBI service response to the first consumer NF.

According to another aspect of the subject matter described herein, the method for delegated authorization at an SCP includes receiving, from a second consumer NF or a second SCP, an access token request; operating as an access token authorization server proxy on behalf of an NF repository function (NRF) that does not support access token authorization in response to the access token request from the second consumer NF or the second SCP; and signaling with the second consumer NF or the second SCP and a second producer NF to enable the second consumer NF to access a service provided by the second producer NF.

According to another aspect of the subject matter described herein, operating as an access token authorization server proxy comprises: generating, in response to the access token request, a second access token; and transmitting, to the second consumer NF or the second SCP, an access token response including the second access token.

According to another aspect of the subject matter described herein, signaling with the second producer NF or the second SCP to enable the second consumer NF to access the service provided by the second producer NF includes: receiving, from the second consumer NF, a second SBI service request including the second access token; removing the second access token from the second SBI service request; forwarding the second SBI service request to the second producer NF; receiving an SBI service response from the second producer NF; and forwarding the SBI service response to the second consumer NF or the second SCP.

According to another aspect of the subject matter described herein, generating the second access token includes generating an OAuth 2.0 access token comprising a dummy access token with syntactically correct claims.

According to another aspect of the subject matter described herein, a system for delegated authorization at a service communication proxy (SCP) is provided. The system includes a first SCP including at least one processor and a memory. The system further includes an access token authorization client proxy implemented by the at least one processor for intercepting, from a first consumer network function (NF) that does not support access-token-based authorization, a service based interface (SBI) request, operating as an access token authorization client to obtain a first access token on behalf of the first consumer NF, and using the first access token to enable the first consumer NF to access the service provided by a first producer NF that requires access-token-based authorization.

According to another aspect of the subject matter described herein, the access token authorization client proxy is configured to signal with an NF repository function (NRF) to obtain the first access token.

According to another aspect of the subject matter described herein, the access token authorization client proxy is configured to signal with the NRF to obtain the first access token by: generating an access token request on behalf of the first consumer NF; transmitting the access token request to the NRF; and receiving, from the NRF, an access token response including the first access token.

According to another aspect of the subject matter described herein, the access token authorization client proxy is configured to generate the access token request by extracting values for at least some attributes to be included in the access token request from a user agent header of the SBI request.

According to another aspect of the subject matter described herein, the values extracted by the access token authorization client proxy include an NF instance ID of the first consumer NF from the user agent header of the SBI request.

According to another aspect of the subject matter described herein, the SBI request includes an SBI service request from the first consumer NF and the access token authorization client proxy is configured to use the first access token to enable the first consumer NF to access the service by: inserting the first access token in the SBI service request; forwarding the SBI service request including the first access token to the first producer NF; receiving an SBI service response from the first producer NF; and forwarding the SBI service response to the first consumer NF.

According to another aspect of the subject matter described herein, the SBI request includes an SBI service access request from the first consumer NF and the access token authorization client proxy is configured to use the first access token to enable the first consumer NF to access the service provided by the first producer NF by: generating an SBI service request based on delegated discovery and NF selection performed in response to the SBI service access request; inserting the first access token in the SBI service request; forwarding the SBI service request including the first access token to the first producer NF; receiving an SBI service response from the first producer NF; and forwarding the SBI service response to the first consumer NF.

According to another aspect of the subject matter described herein, the system for delegated authorization at an SCP includes an access token authorization server proxy for receiving, from a second consumer NF or a second SCP, an access token request; operating as an access token authorization server on behalf of an NF repository function (NRF) that does not support access token authorization in response to the access token request from the second consumer NF; and signaling with the second consumer NF or the second SCP and a second producer NF to enable the second consumer NF to access a service provided by the second producer NF.

According to another aspect of the subject matter described herein, the access token authorization server proxy, in operating as the access token authorization server, is configured to: generate, in response to the access token request, a second access token; and transmit, to the second consumer NF or the second SCP, an access token response including the second access token.

According to another aspect of the subject matter described herein, the access token authorization server proxy is configured to signal with the second consumer NF or the second SCP and the second producer NF to enable the second consumer NF to access the service provided by the second producer NF by: receiving, from the second consumer NF or the second SCP, a second SBI service request including the second access token; removing the second access token from the second SBI service request; forwarding the SBI service request to the second producer NF; receiving an SBI service response from the second producer NF; and forwarding the SBI service response to the second consumer NF or the second SCP.

According to another aspect of the subject matter described herein, a non-transitory computer readable medium having stored thereon executable instructions that when executed by a processor of a computer controls the computer to perform steps is provided. The steps include, intercepting, from a consumer network function (NF) that does not support access token based authorization, a service based interface (SBI) request. The steps further include operating as an access token authorization client proxy to obtain a first access token on behalf of the first consumer NF. The steps further include using the first access token to enable the consumer NF to access the service provided by a producer NF that requires access-token-based authorization.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 7C is a flow chart illustrating in more detail the step from FIG. 7A of using an access token to enable a consumer NF that does not support OAuth 2.0 authorization to access a service provided by a producer NF that requires OAuth 2.0 authorization;

DETAILED DESCRIPTION

Figure 1:
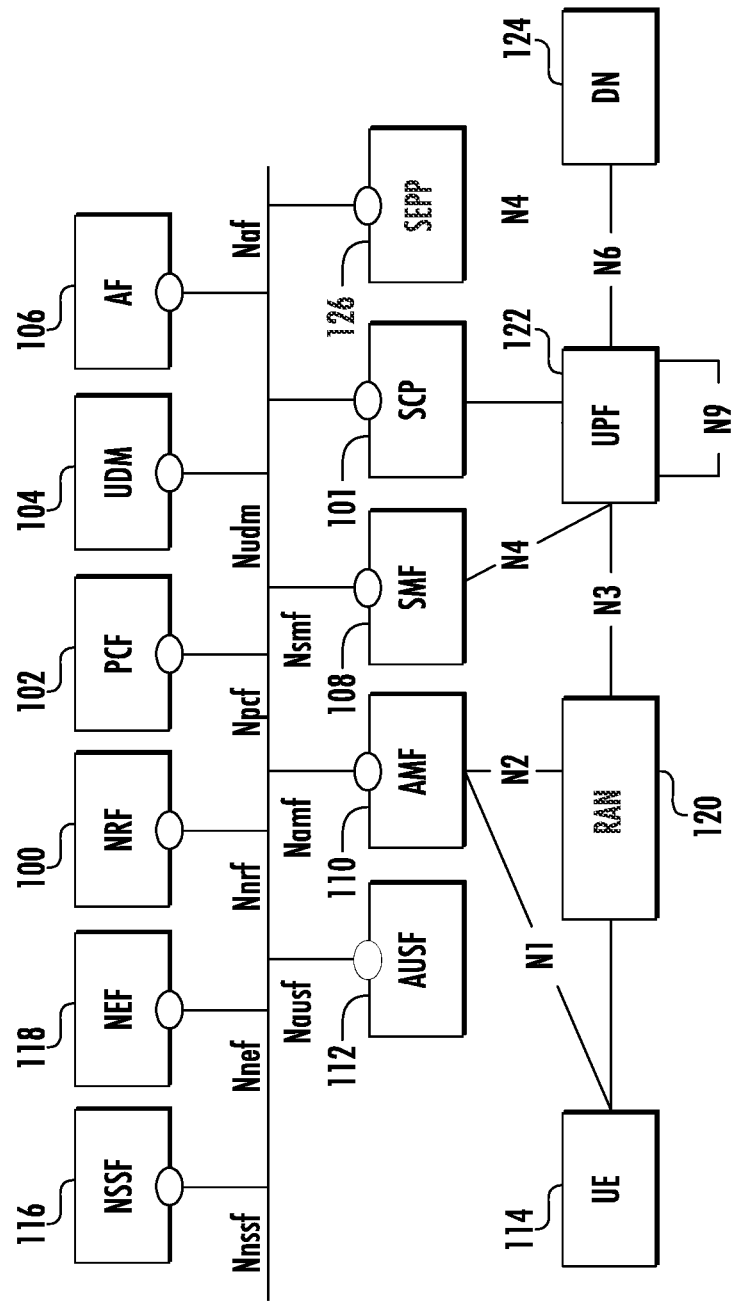
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipments (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2A:
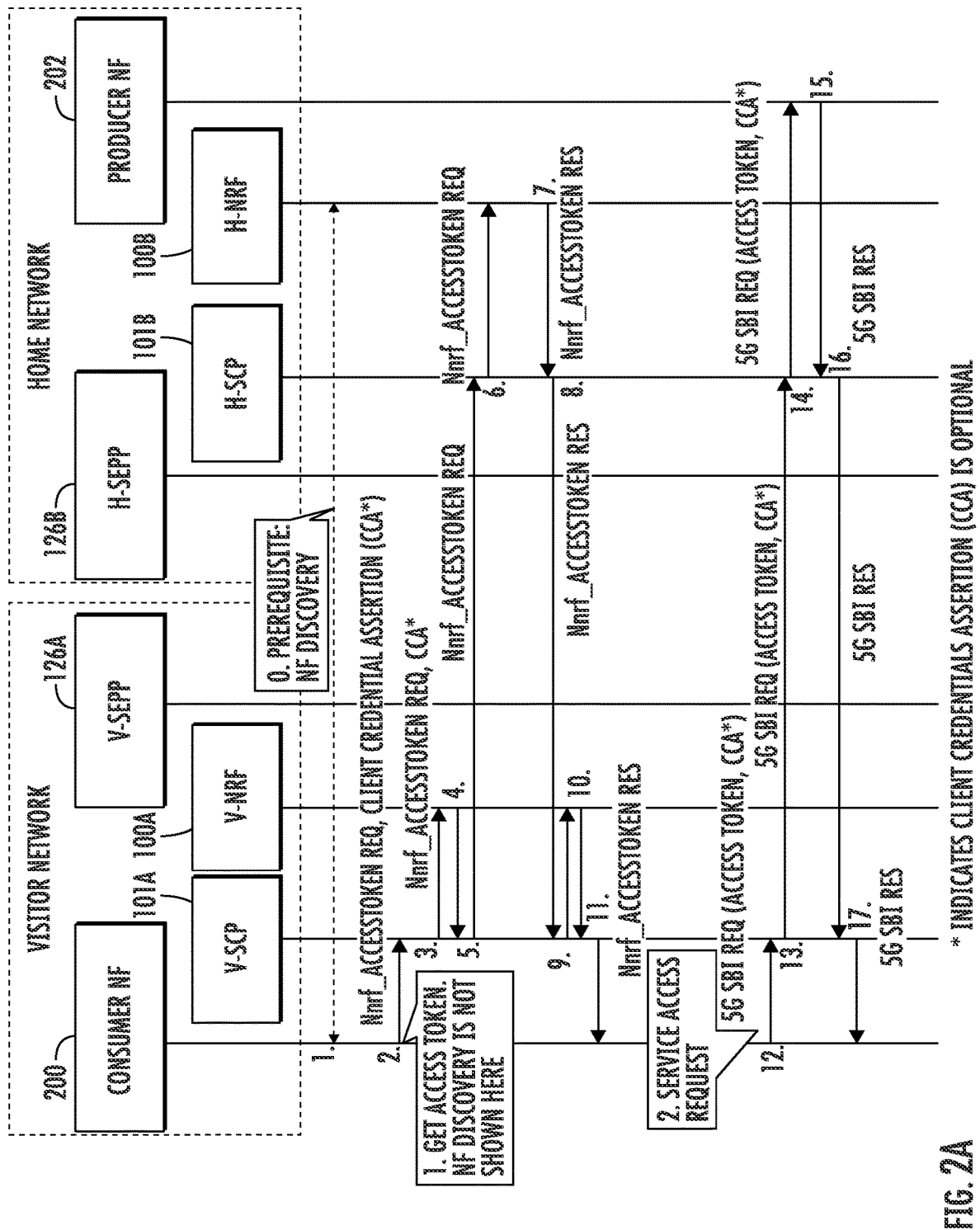
FIG. 2A is a message flow diagram illustrating exemplary messages exchanged in accessing a service in a 5G communications network using the OAuth 2.0 authorization framework, where the message flow is for indirect inter-PLMN communications without delegated discovery (Model C)

As described above, one problem that can occur in 5G networks is lack of universal support for OAuth 2.0 authorization, which can result in service incompatibility between networks. FIG. 2A is a message flow diagram illustrating OAuth 2.0 authorization between PLMNs and the use of an access token to access a service across a PLMN boundary. The message flow in FIG. 2A is for indirect inter-PLMN communications without delegated discovery, which is defined as Model C in Annex E of 3GPP TS 23.501. According to the specification for Model C, consumer NFs conduct discovery by querying the NRF. Based on the discovery result, the consumer NF selects a producer NF or an NF set. The consumer NF then sends an SBI service request to the SCP containing the address of the selected producer NF or producer NF set. If the service request specifies an NF set, the SCP may interact with the NRF to obtain selection parameters, such as location, capacity, etc., and use these parameters to select a producer NF instance. The SCP routes the SBI service request to the selected producer NF instance.

Referring to the message flow in FIG. 2A, in line 1, a consumer NF 200 performs NF discovery to select a producer NF instance or NF set by signaling with NRF 100B via SCPs 101A and 101B and SEPPs 126A and 126B. In line 2, after selecting a producer NF or NF set, consumer NF 200 sends an Nnrf access token request message to NRF 100A located in the visitor network (the network local to the visitor PLMN in which the UE that triggered the access token request is currently roaming). NRF 100A forwards the access token request message to remote NRF 100B via SCPs 101A and 101B and SEPPs 126A and 126B. This forwarding is indicated by lines 2-6 in FIG. 2A.

Home NRF 100B determines whether the client is authorized to receive an access token and returns an access token by transmitting an access token response message. In lines 7-11, the access token response message is communicated to consumer NF 200 via SCPs 101A and 101B, SEPPs 126A and 126B, and NRF 100A.

Consumer NF 200 generates an SBI service request message including the access token and sends the SBI service request message to producer NF 202 via SCPs 101A and 101B and SEPPs 126A and 126B, as indicated by lines 12-14. The SBI service request message includes the access token. The SBI request may optionally include the client credentials assertion (CCA) attribute, as indicated by "CCA*" in FIG. 2A.

Producer NF 202 validates the access token and grants consumer NF 200 access to the service. In lines 15-17, producer NF 202 returns an SBI service response message to consumer NF 200. A similar flow occurs when the consumer NF exists in the home network, and the producer NF exists in a visitor or non-home network. Thus, FIG. 2A illustrates the case where two different networks support OAuth 2.0 authorization and indirect inter-PLMN communication via SCPs and, as a result, the access token messaging and service request messaging is successful. However, if one or the other network does not support OAuth 2.0 authorization, the service request and/or access token messaging will not be successful.

Figure 2B:
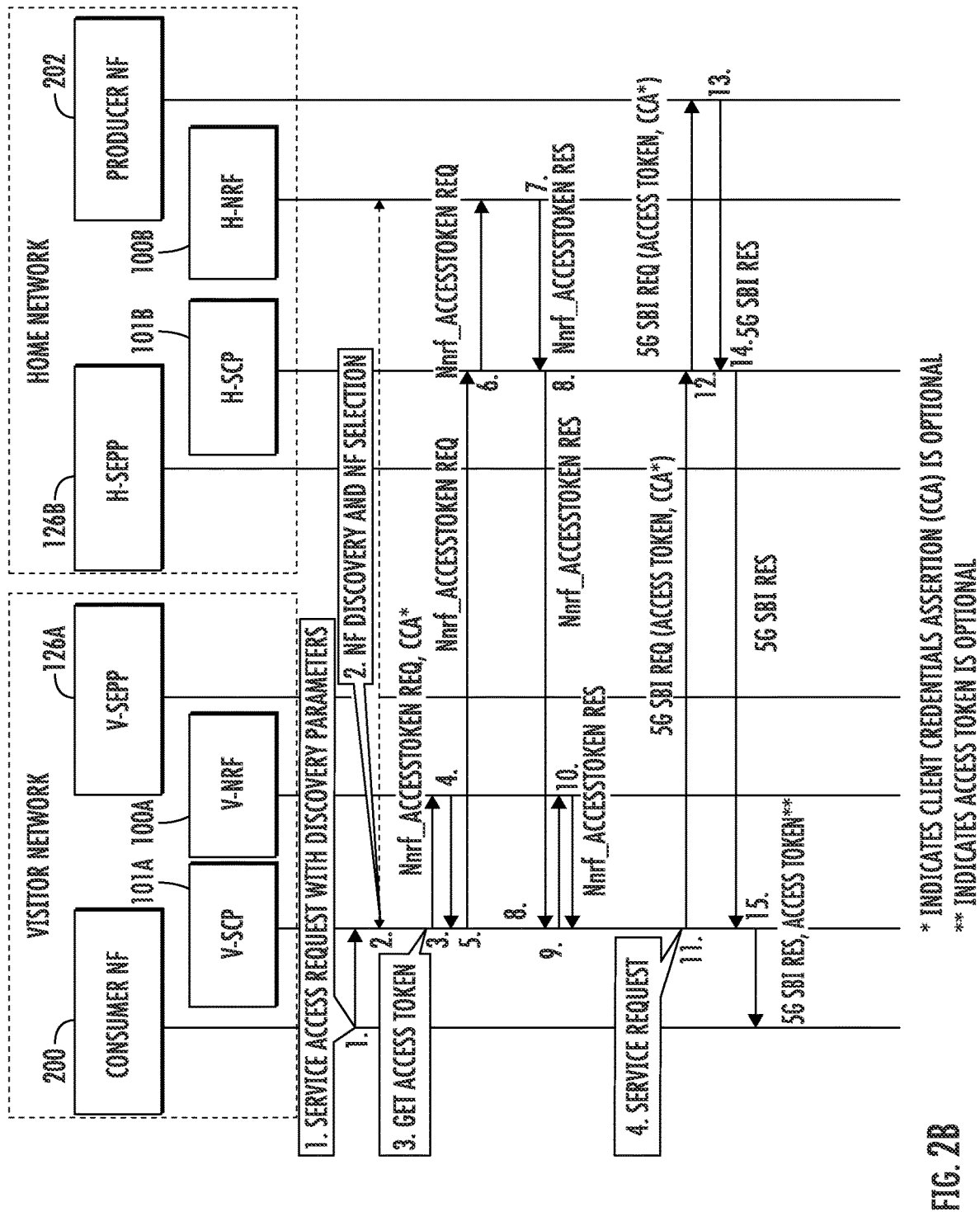
FIG. 2B is a message flow diagram illustrating exemplary messages exchanged in accessing a service in a 5G communications network using the OAuth 2.0 authorization framework, where the message flow is for indirect inter-PLMN communications with delegated discovery (Model D)

FIG. 2B is a message flow diagram illustrating indirect inter-PLMN communications with delegated discovery and OAuth 2.0 authorization. Indirect communication with delegated discovery is defined as Model D in Annex E of 3GPP TS 23.501. According to Model D, consumer NFs do not perform NF selection or discovery. Instead, the consumer NF adds necessary discovery and selection parameters to the discovery request that is sent to the SCP. The SCP then performs discovery with an NRF, obtains a discovery result, and sends the SBI service request to the selected NF. Referring to the message flow in FIG. 2B, in line 1, consumer NF 200 sends an SBI service access request message with discovery and producer NF selection parameters to SCP 101A. In line 2, SCP 101A performs discovery with NRF 101B. The result of the discovery is the selection of producer NF 202 to process the service request message. However, before sending the service request message to producer NF 202, SCP 101A must obtain an access token from NRF 100B in the network of producer NF 202. Accordingly, in line 3, SCP 101A sends an access token request message to local NRF 100A. Local NRF 100A forwards the access token request message to remote NRF 100B via SCPs 101A and 101B and SEPPs 126A and 126B, as indicated by lines 4-6 of the message flow diagram.

NRF 100B determines if the client is authorized and returns the access token via SCPs 101B and 101A and SEPPs 126B an 126A. The returning of the access token is illustrated via lines 7-10 in the message flow in FIG. 2B.

In lines 11 and 12, SCP 101A sends an SBI service request message to producer NF 202, which was selected during the delegated discovery procedure represented by line 2, via SEPPs 126A and 126B and SCP 101B. Producer NF 202 validates the access token and, in lines 13-15, sends an SBI service response to consumer NF 200 via his SCPs 101B and 101A and SEPPs 126B and 126A. The SBI service response communicated to consumer NF 200 may optionally include the access token, as indicated by "Access Token **" in FIG. 2B.

A similar flow occurs when the consumer NF is in the home network and the producer NF is in a visitor network. Thus, FIG. 2B illustrates the case where the SCP serving the consumer NF and the NRF in the network of the producer NF support OAuth 2.0 authorization and indirect inter-PLMN communication with delegated discovery is performed.

Figure 3A:
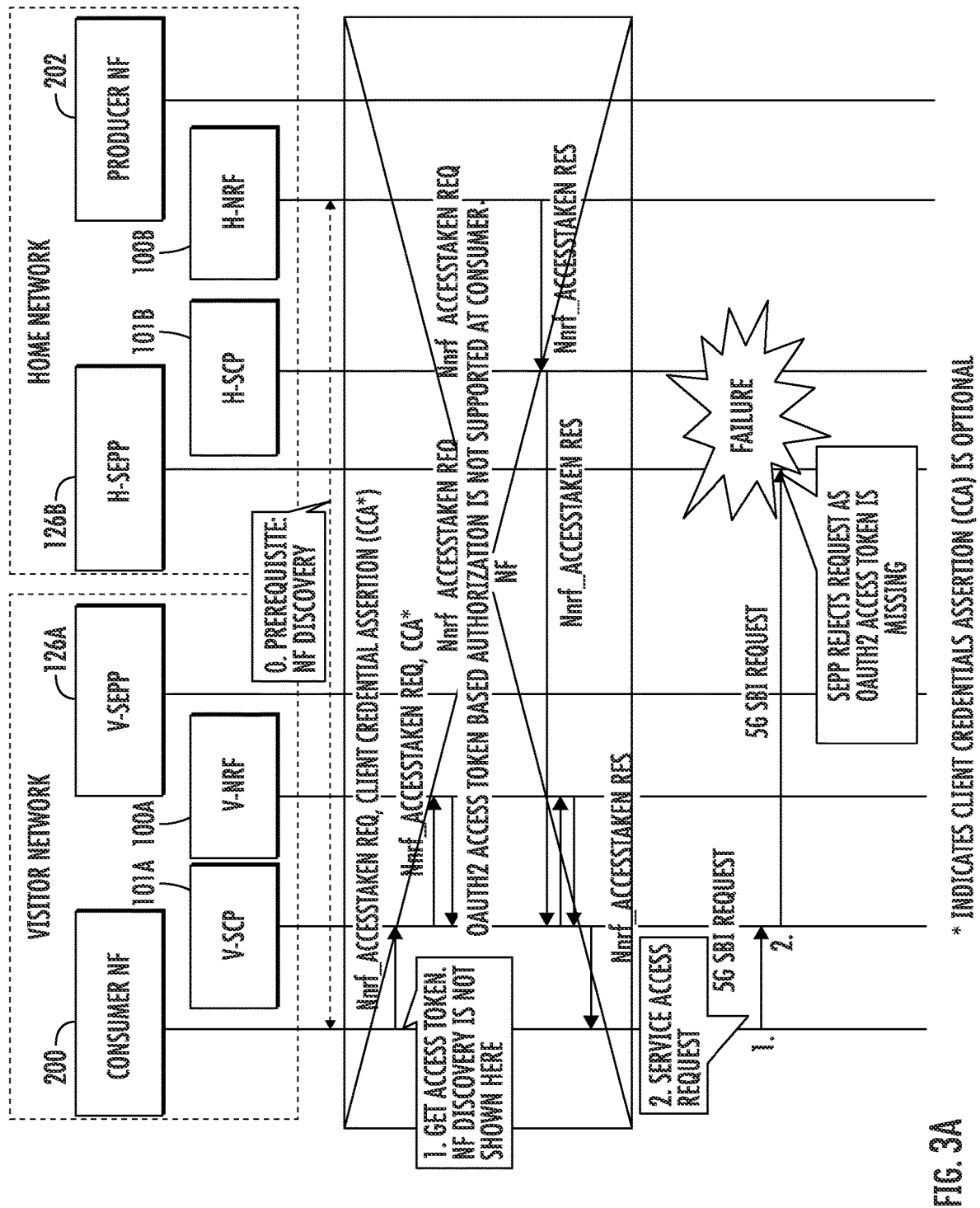
FIG. 3A is a message flow diagram illustrating exemplary messages exchanged when a consumer NF does not support OAuth 2.0 authorization and a producer NF requires OAuth 2.0 authorization as a condition to allowing access to a service provided by the producer NF, where the message flow is for indirect inter-PLMN communications without delegated discovery (Model C)

FIG. 3A illustrates the case of inter-PLMN indirect communications without delegated discovery where the NF service consumer does not support OAuth 2.0 authorization and the NF service producer requires OAuth 2.0 authorization. Referring to FIG. 3A, the inter-PLMN signaling to obtain an access token from lines 1-11 of FIG. 2A does not occur because the visitor network in this example does not support OAuth2.0 authorization. The message flow in FIG. 3A begins in line 1, where consumer NF 200 sends an SBI service request message without an access token to producer NF 202 located in a different PLMN and that requires access token authorization. Because the service request does not include an access token, the service request in line 2 is rejected by home SEPP 126B. SEPP 126B rejects the service request because 3GPP TS 33.501, section 13.4.1.2.2 suggests that the provider SEPP shall check that the serving PLMN of the subject claim in the access token matches the remote PLMN corresponding to the N32-f context ID in the N32 message. Because the service request message in line 2 does not include an access token, there is no subject claim for SEPP 126B to validate, and thus the message is rejected.

Figure 3B:
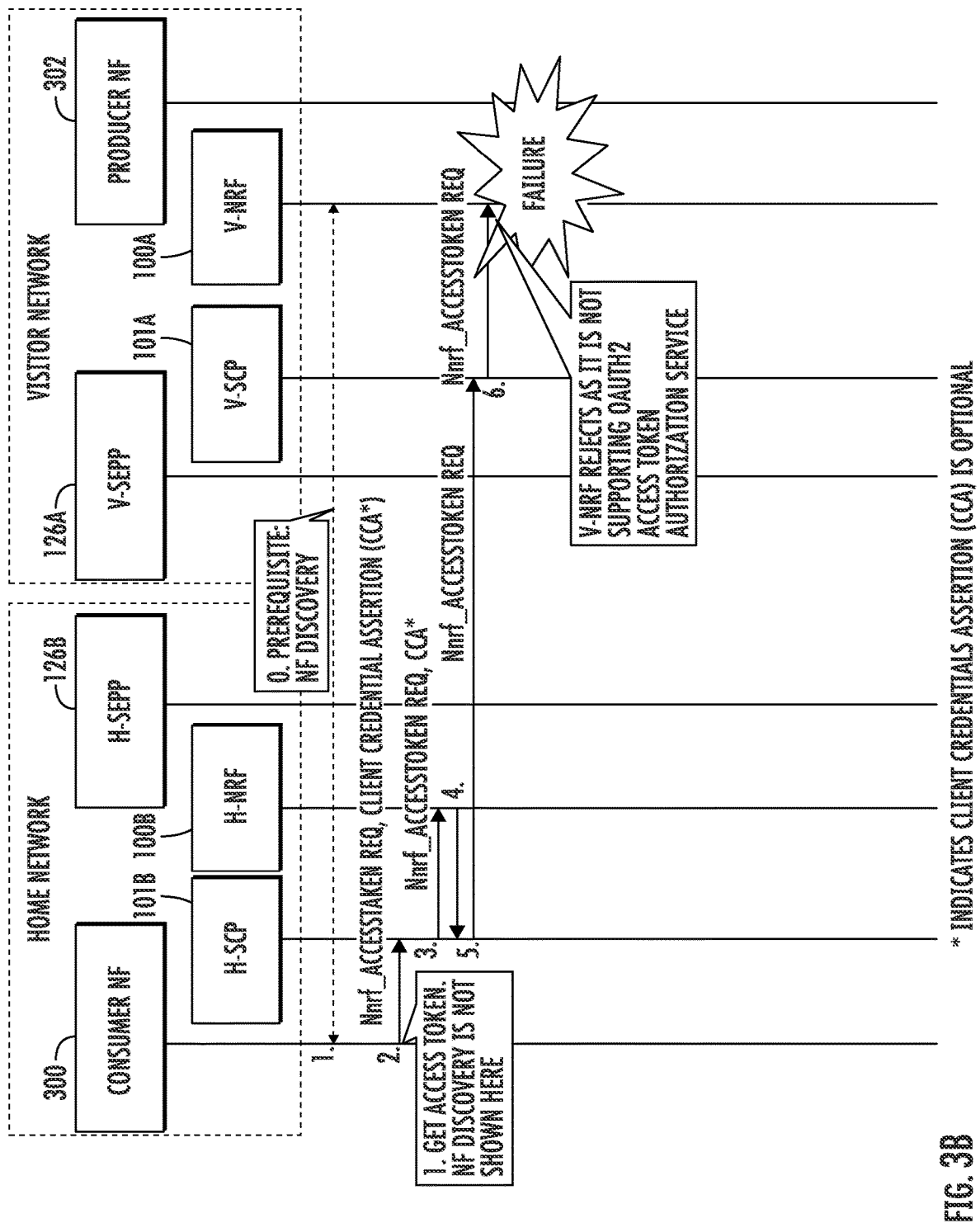
FIG. 3B is a message flow diagram illustrating exemplary messages exchanged when a consumer NF supports OAuth 2.0 authorization and an NRF does not support OAuth 2.0 authorization, where the message flow is for indirect inter-PLMN communications without delegated discovery (Model C)

While FIG. 3A illustrates the case of indirect inter-PLMN communications without delegated discovery where the consumer NF does not support OAuth 2.0 authorization, and the producer NF supports OAuth 2.0 authorization, FIG. 3B illustrates the case of indirect inter-PLMN communications without delegated discovery where the consumer NF supports OAuth 2.0 authorization, and the NRF in the network of the producer NF does not. Referring to the message flow in FIG. 3B, in line 1, a consumer NF 300 located in the home network signals with NRF 100A located in the visitor network to perform service discovery. It is assumed in this example, that the result of the service discovery is the selection of producer NF 302 located in the visitor network to provide the requested service.

After service discovery, in line 2, consumer NF 300 sends an access token request message to SCP 101B located in the home network. In line 3, SCP 101B sends the access token request to NRF 100B. In line 4, NRF 100B forwards the access token request to SCP 101B, which, in line 5, routes the access token request to remote SCP 101A. In line 6, SCP 101A routes the access token request to NRF 100A located in the visitor network. In this example, visitor NRF 100A does not support OAuth 2.0 authorization. Accordingly, visitor NRF 100A cannot respond to the access token request, which results in failure of the access token messaging. As a result, consumer NF 300 may be unable to access services provided by the visitor network.

Figure 3C:
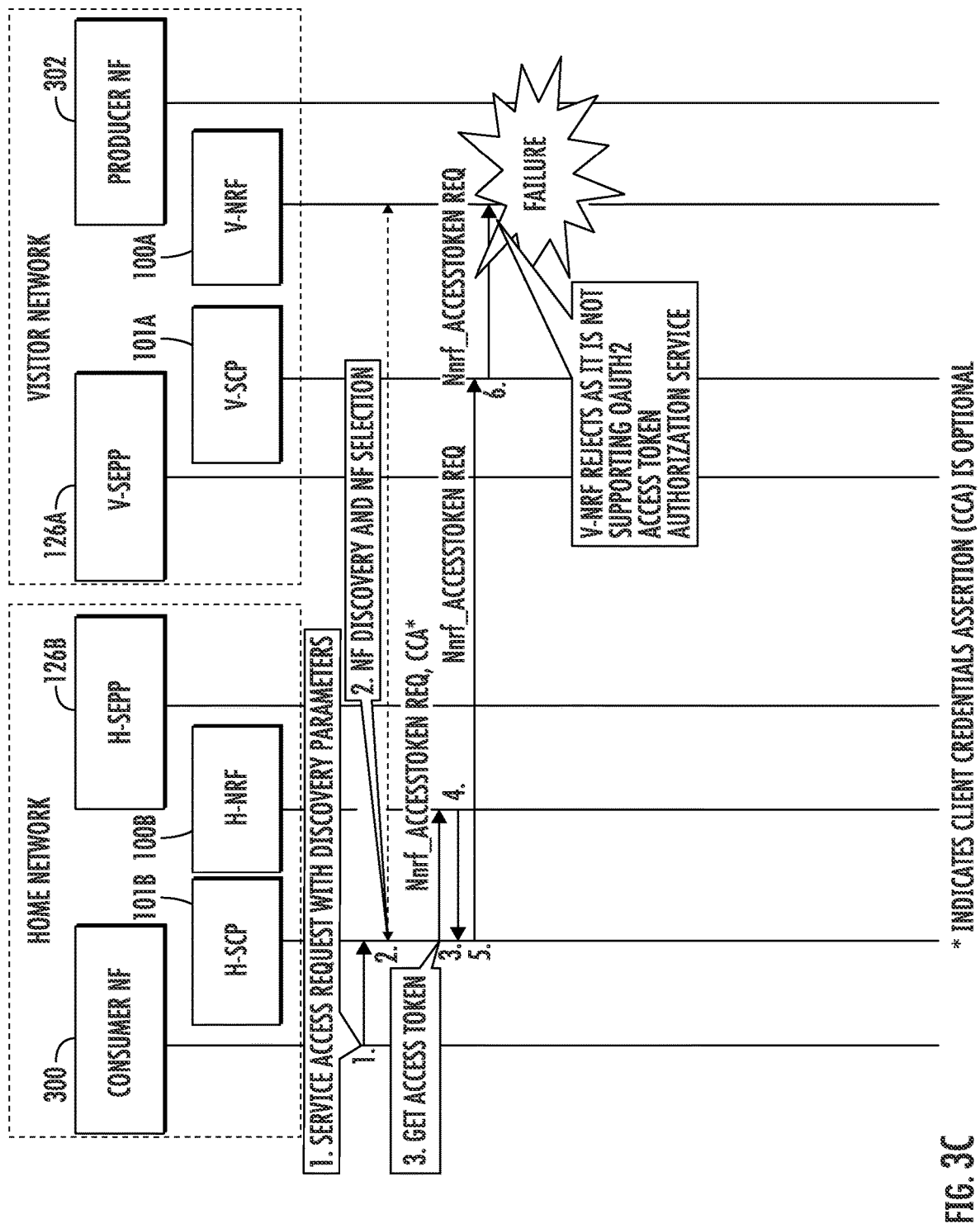
FIG. 3C is a message flow diagram illustrating exemplary messages exchanged when a consumer NF supports OAuth 2.0 authorization and an NRF does not support OAuth 2.0 authorization, where the message flow is for indirect inter-PLMN communications with delegated discovery (Model D)

FIG. 3C illustrates the case of indirect inter-PLMN communications with delegated discovery where the consumer NF supports OAuth 2.0 authorization, and the producer NF does not. Referring to the message flow in FIG. 3C, in line 1, a consumer NF 300 located in the home network sends a service access request with discovery parameters to SCP 101B. In line 2, SCP 101B signals with NRF 100A located in the visitor network to perform service discovery. It is assumed in this example, that the result of the service discovery is the selection of producer NF 302 located in the visitor network to provide the requested service.

After service discovery, in line 3, SCP 101B sends an access token request to NRF 100B. In line 4, NRF 100B forwards the access token request to SCP 101B, which, in line 5, routes the access token request to remote SCP 101A. In line 6, SCP 101A routes the access token request to NRF 100A located in the visitor network. In this example, visitor NRF 100A does not support OAuth 2.0 authorization. Accordingly, visitor NRF 100A cannot respond to the access token request, which results in failure of the access token messaging. As a result, consumer NF 300 may be unable to access services provided by the visitor network.

In order to avoid this difficulty, the SCP described herein functions as an access token authorization client proxy on behalf of consumer NFs that do not support access-token-based authorization and as an access token authorization server on behalf of NRFs that do not support access-token-based authorization. For consumer NFs not supporting access-token-based authorization, the SCP fetches the access token and adds the access token to SBI requests before forwarding the requests to the producer NF. The SCP can choose to cache the token to speed up processing. The SCP may utilize fields from the user agent header provided by the consumer NF in the SBI service or SBI service access request to obtain the NF type and the NF instance ID used to create the access token request on behalf of the consumer NF. When the SCP functions as an OAuth 2.0 authorization server, the SCP issues an access token to the requesting consumer NF or SCP, depending on whether or not delegated discovery is performed.

Figure 4:
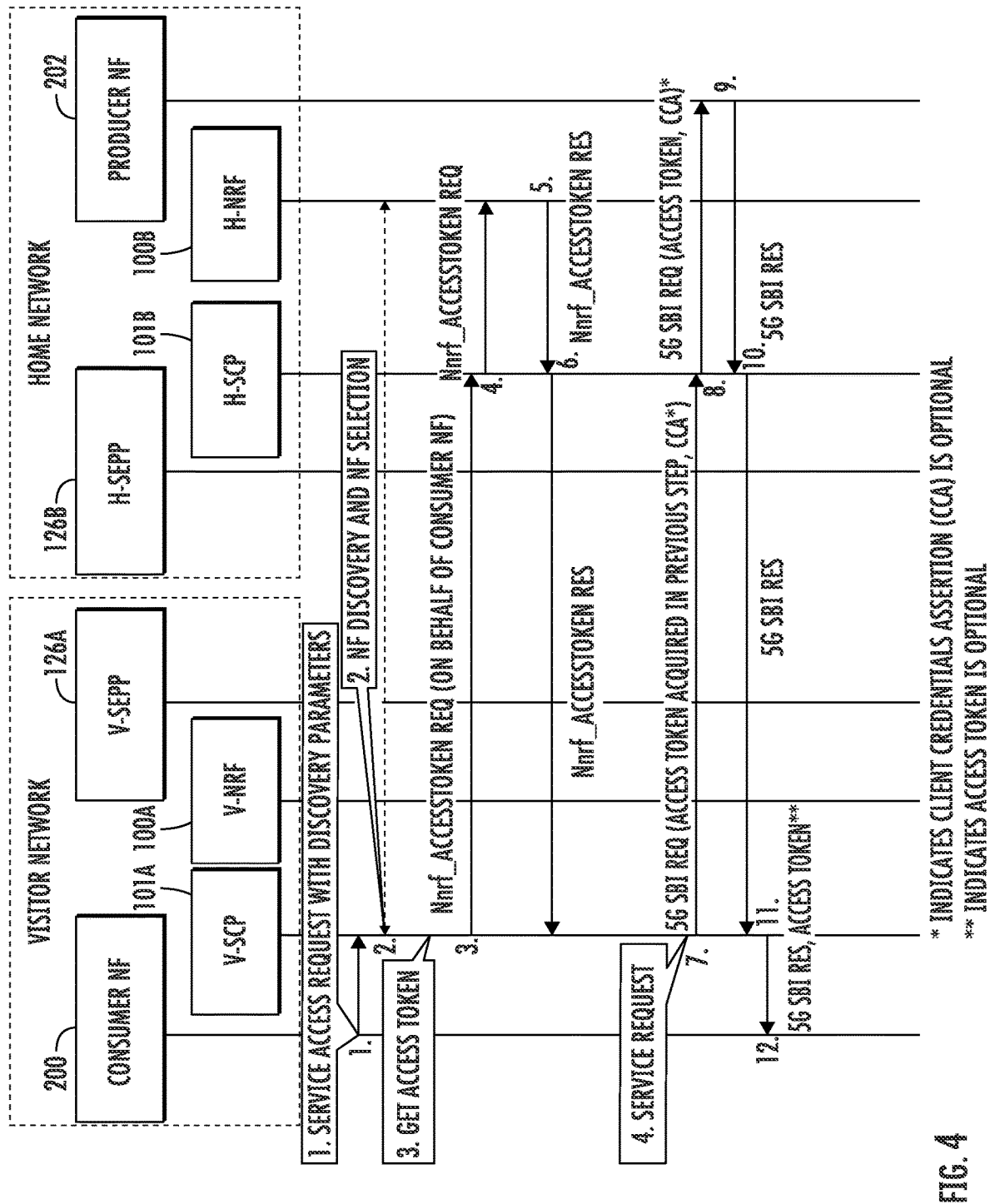
FIG. 4 is a message flow diagram illustrating delegated OAuth 2.0 authorization when an SCP operates as an OAuth 2.0 authorization client proxy on behalf of a consumer NF that does not support OAuth 2.0 authorization, where the message flow is for indirect inter-PLMN communications with delegated discovery (Model D)

FIG. 4 illustrates the case of indirect inter-PLMN communications with delegated discovery where the SCP acts as an OAuth 2.0 authorization client proxy on behalf of a consumer NF that does not support OAuth 2.0 authorization. Referring to FIG. 4, in line 1 of the message flow diagram, consumer NF 200 sends an SBI service access request without an access token to SCP 101A. In line 2, SCP 101A performs delegated discovery on behalf of consumer NF 200 by signaling with NRF 100B, and the result of the delegated discovery is the selection of producer NF 202.

Rather than generating an SBI service request in response to the service access request in line 1, SCP 101A detects that the service access request does not include an access token, intercepts and stores the service access request, and fetches an access token on behalf of consumer NF 200. The process of fetching the access token begins in line 3 of the message flow diagram where SCP 101A formulates and sends an access token request to SCP 101B, which, in line 4, routes the access token request to NRF 100B located in the PLMN of producer NF 202. Formulation of the access token request message will be described in further detail below. NRF 100B validates consumer NF 200, generates an access token response including the access token, and, in lines 5 and 6, sends the access token response to the network of consumer NF 200 via SEPPs 126B and 126A and SCP 101B.

SCP 101A receives the access token response, extracts the access token from the response, generates an SBI service request based on the SBI service access request received in line 1, and inserts the access token in the generated SBI service request. In lines 7 and 8, SCP 101A forwards the SBI service request with the access token to producer NF 202. Producer NF 202 validates the service request using the access token, and, in lines 9-11, generates and sends an SBI service response message to consumer NF 200. Thus, FIG. 4 illustrates the case where SCP 101A functions as an OAuth 2.0 authorization client proxy on behalf of a consumer NF that does not support OAuth 2.0 authorization.

Figure 5A:
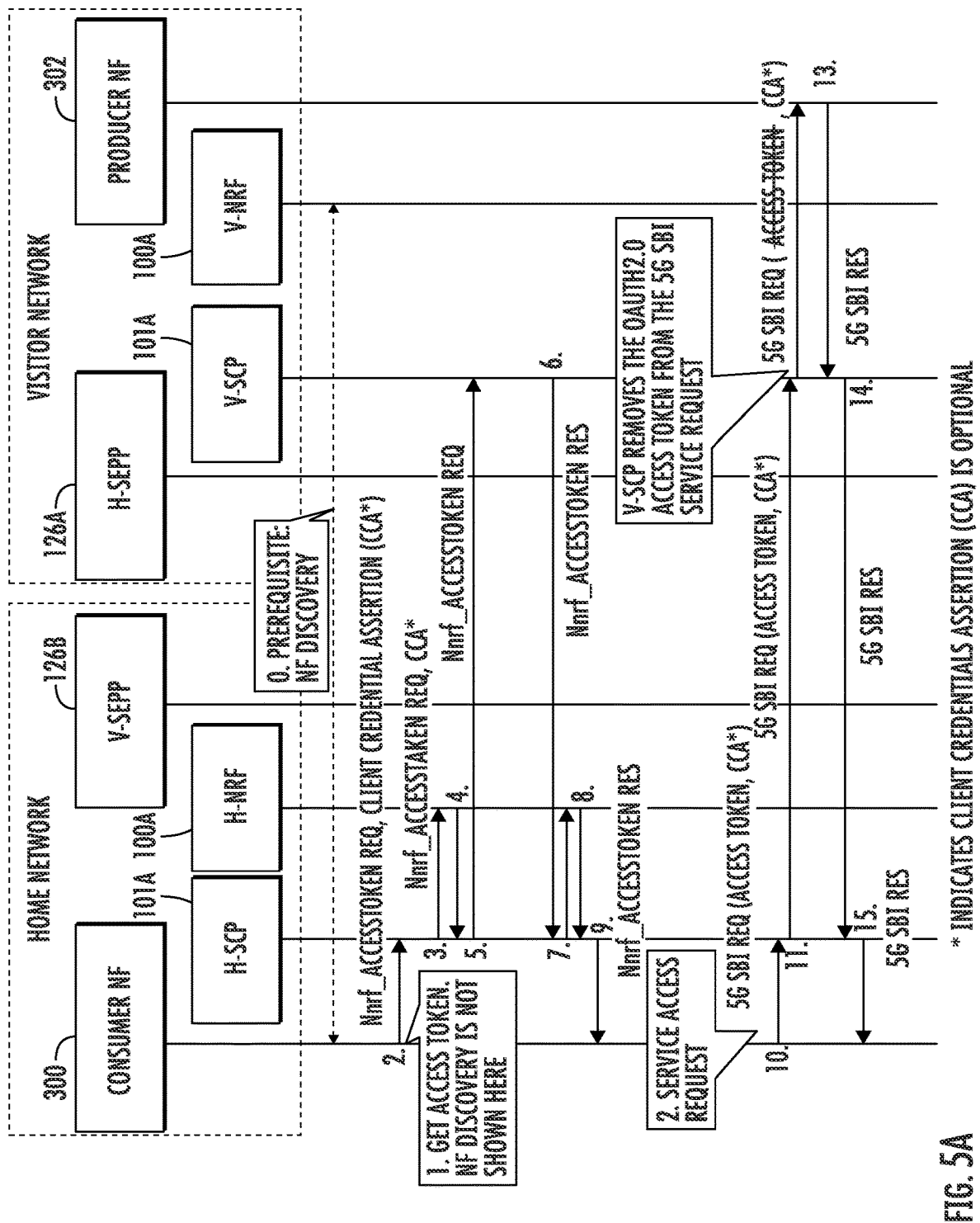
FIG. 5A is a message flow diagram illustrating exemplary messages exchanged when an SCP operates as an OAuth 2.0 authorization server proxy on behalf of an NRF that does not support OAuth 2.0 authorization, where the message flow is for indirect inter-PLMN communications without delegated discovery (Model C)

In another example, SCP 101A may function as an access token authorization server. One such example is illustrated in FIG. 5A, which illustrates indirect, inter-PLMN communications without delegated discovery where consumer NF 300 located in the home network and that does not support OAuth 2.0 authorization seeks to access a service provided by producer NF 302 located in the visitor network. Referring to FIG. 5A, in line 1, consumer NF performs service discovery by signaling with NRF 100A, and the result of the service discovery is selection of producer NF 302 to provide the service.

In line 2, consumer NF 300 generates an access token request message and forwards the access token request to SCP 101B. In line 3, SCP 101B forwards the access token request to NRF 100B. NRF 100B, in lines 4 and 5, forwards the access token request message to NRF 100A. However, NRF 100A does not support OAuth 2.0 authorization. Accordingly, instead of forwarding the access token request to NRF 100A, SCP 101A intercepts the access token request message and generates an access token response message on behalf of NRF 100A. The access token response message includes an access token generated by SCP 101A using information local to SCP 101A. The access token may be syntactically correct in that it includes all of the required access token claims. In lines 6-9, SCP 101A forwards the access token response to consumer NF 300.

In line 10, consumer NF 300 generates and sends, via SCPs 101B and 101A and SEPPs 126B and 126A, an SBI service request to producer NF 302 where the service request includes the access token. In line 11, SCP 101A intercepts the SBI service request and removes the access token from the service request, since producer NF 302 does not support OAuth 2.0 authorization. In line 12, SCP 101A forwards the service request (without the access token) to producer NF 302. In lines 13-15, producer NF 302 generates and sends an SBI service response message to consumer NF 300. Thus, FIG. 5A illustrates the case where SCP 101A functions as an OAuth 2.0 authorization server proxy on behalf of an NRF that does not support OAuth 2.0 authorization.

Figure 5B:
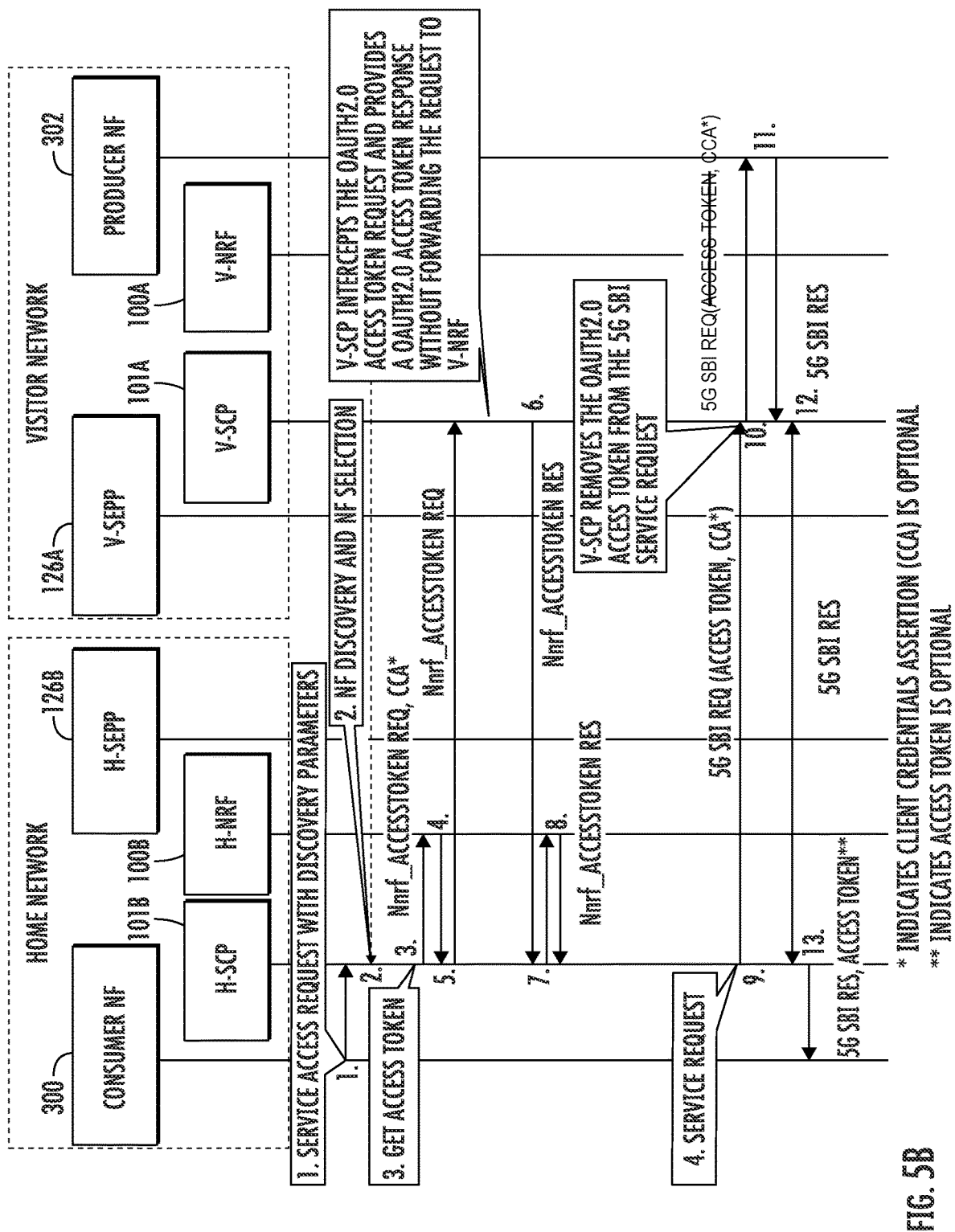
FIG. 5B is a message flow diagram illustrating exemplary messages exchanged when an SCP operates as an OAuth 2.0 authorization server proxy on behalf of an NRF that does not support OAuth 2.0 authorization, where the message flow is for indirect inter-PLMN communications with delegated discovery (Model D)

While FIG. 5A illustrates the case where the SCP acts as an OAuth 2.0 authorization server for indirect communications with inter-PLMN without delegated discovery, FIG. 5B illustrates the case where the SCP acts as an OAuth 2.0 authorization server for indirect inter-PLMN communications with delegated discovery. Referring to FIG. 5B, in line 1 of the message flow diagram, consumer NF 300 located in the home network sends a service access request message with discovery parameters to SCP 101B. In line 2, SCP 101B performs delegated NF discovery and selection by signaling with NRF 100A located in the visitor network. The result of the delegated discovery and NF selection is the selection of producer NF 302 located in the visitor network to provide the requested service.

After performing delegated discovery and NF selection, in line 3, SCP 101B generates an access token request message and forwards the access token request message to NRF 100B. NRF 100B, in lines 4 and 5, forwards the access token request message to NRF 100A. However, NRF 100A does not support OAuth 2.0 authorization. Instead of forwarding the access token request to NRF 100A, SCP 101A intercepts the access token request and generates an access token response on behalf of NRF 100A. The access token response includes an access token generated by SCP 101A using information local to SCP 101A. The access token may be syntactically correct in that it includes all of the required access token claims. In lines 6-8, SCP 101A forwards the access token response to SCP 101B.

In line 9, SCP 101B generates and sends, via SEPPs 126B and 126A and SCP 101A, an SBI service request to producer NF 302, where the service request includes the access token. SCP 101A intercepts the SBI service request and removes the access token from the service request, since producer NF 302 does not support OAuth 2.0 authorization. In line 10, SCP 101A forwards the service request (without the access token) to producer NF 302. In lines 11-13, producer NF 302 generates and sends an SBI service response message to consumer NF 300. Thus, FIG. 5B illustrates the case where SCP 101A performs delegated discovery and NF selection and functions as an OAuth 2.0 authorization server proxy on behalf of an NRF that does not support OAuth 2.0 authorization.

Figure 6:
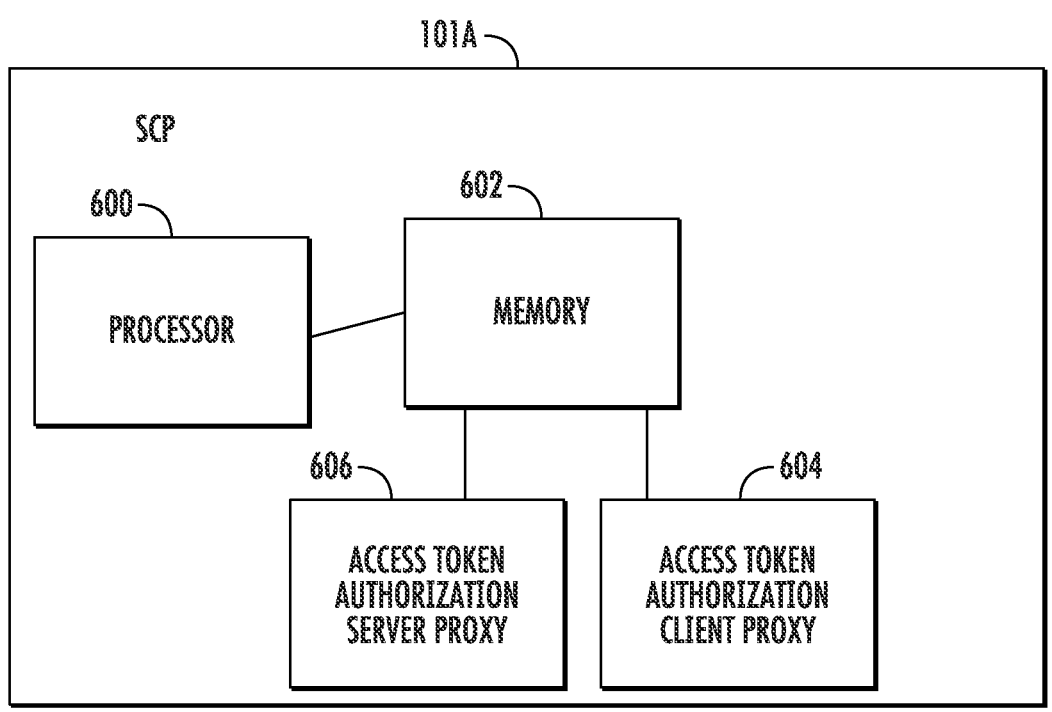
FIG. 6 is a block diagram illustrating an SCP capable of performing delegated OAuth 2.0 authorization on behalf of NF service consumers and NRFs that do not support OAuth 2.0 authorization.

FIG. 6 is a block diagram illustrating an exemplary architecture for a SCP that supports OAuth 2.0 authorization proxying as described herein. Referring to FIG. 6, SCP 101A includes at least one processor 600 and a memory 602. SCP 101A further includes an access token authorization client proxy 604 for performing the operations described above with regard to FIG. 4 for the delegated discovery case of obtaining an OAuth 2.0 access token on behalf of a consumer NF that does not support OAuth 2.0 authorization and generating an SBI service request message that includes an OAuth 2.0 access token to enable the consumer NF to access the service provided by a producer NF that supports OAuth 2.0 authorization. For the non-delegated discovery case, access token authorization client proxy 604 may obtain and insert an OAuth 2.0 access token in an SBI service request message from a consumer NF that does not support OAuth 2.0 authorization.

SCP 101A further includes access token authorization server proxy 606 that performs the functions of an OAuth 2.0 authorization server on behalf of an NRF that does not support OAuth 2.0 authorization, as described above with regard to FIGS. 5A and 5B. Access token authorization server proxy 606 may also remove access tokens from service request messages destined for producer NFs that do not support access-token-based authorization. Access token authorization client proxy 604 and access token authorization server proxy 606 may be implemented using computer executable instructions stored in memory 602 that cause processor 600 to perform the access token authorization client and server proxying operations described above.

Figure 7A:
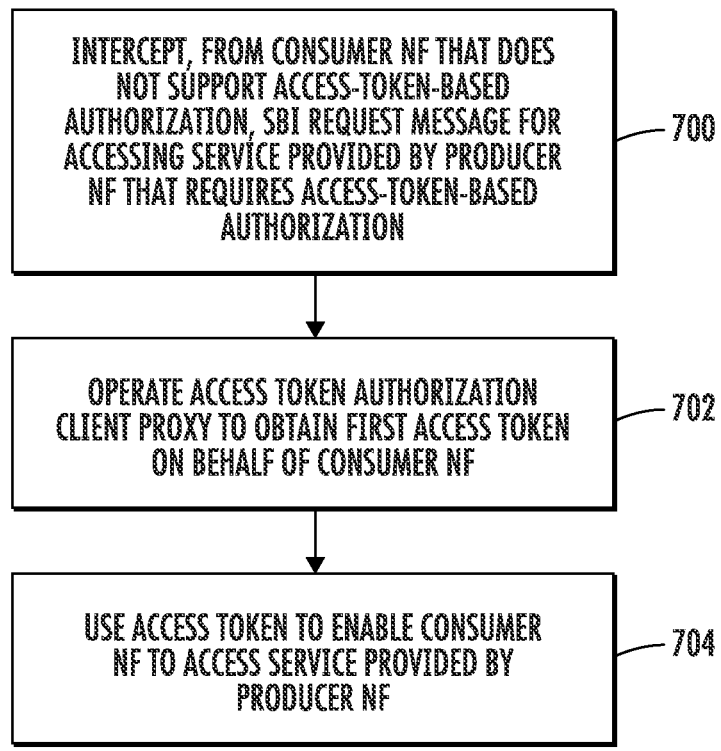
FIG. 7A is a flow chart illustrating an exemplary process of performing delegated OAuth 2.0 authorization on behalf of a consumer NF that does not support OAuth 2.0 authorization.

FIG. 7A is a flow chart illustrating an exemplary overall process for performing delegated authorization at an SCP, wherein the SCP functions as an access token authorization client proxy. Referring to FIG. 7A, in step 700, the process includes intercepting, from a consumer NF that does not support access token-based authorization, an SBI request for accessing a service provided by a producer NF that requires access-token-based authorization. For example, for the case of indirect inter-PLMN communications without delegated discovery, SCP 101A may receive an SBI service request from a consumer NF for accessing a service provided by producer NF 202. For the case of indirect inter-PLMN communications with delegated discovery, SCP 101A may receive a service access request from a consumer NF.

Figure 7B:
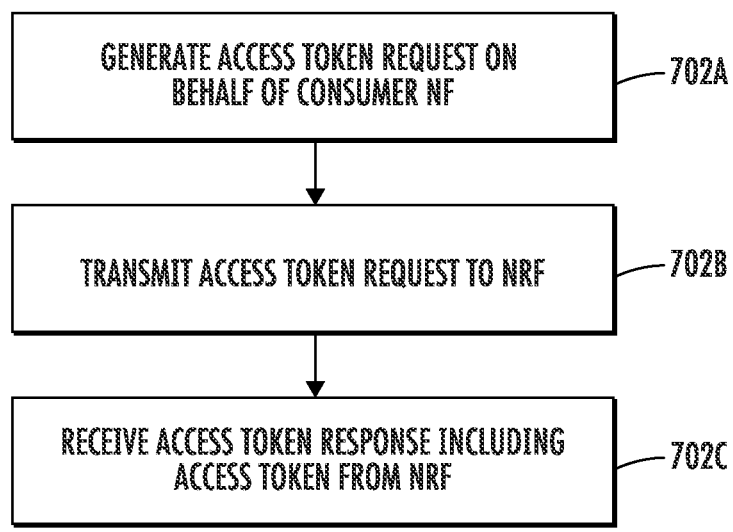
FIG. 7B is a flow chart illustrating in more detail the step from FIG. 7A of operating as an access token authorization client proxy on behalf of a consumer NF that does not support OAuth 2.0 authorization.

In step 702, the process includes operating as an access token authorization client proxy to obtain an access token on behalf of the consumer NF. For example, SCP 101A may function as an OAuth 2.0 authorization client proxy to obtain an access token on behalf of a consumer NF that does not support OAuth 2.0 authorization. FIG. 7B illustrates additional details of step 702 in FIG. 7A. Referring to FIG. 7B, in step 702A, the process includes generating an access token request message on behalf of the consumer NF. Table 1 shown below illustrates attributes that must be included in an access token request message.

TABLE 1

Access Token Request Attributes

| Attribute name | Data type | Extracted From |
|---|---|---|
| grant_type | string | client_credentials |
| nfInstanceId | NfInstanceId | User-Agent header present in 5GC SBI request |
| nfType | NFType | User-Agent header present in 5GC SBI request |
| targetNfType | NFType | API name from R-URI |
| scope | string | Service Name from R-URI |
| requesterPlmn | PlmnId | From SCP configuration |
| targetPlmn | PlmnId | From Target FQDN |

The minimum set of attributes that must be included in an access token request are the grant type, the NF instance ID, the NF type, the target NF type, the scope, the requester PLMN, and the target PLMN. The grant type attribute may be obtained from consumer NF credentials populated from the SBI service request or service access request message. The NF instance ID may be populated from the user agent header of the SBI service request message or service access request message. According to 3GPP TS 29.500, section 5.2.2, the user agent header is a mandatory header in an SBI service request message. Table 2 shown below illustrates the structure of the user agent parameter.

TABLE 2

User Agent Parameter

| User-Agent | IETF RFC 7231 [11] | This header shall be mainly used to identity the NF type of the HTTP/2 client. The pattern of the content should start with the value of NF type (e.g. udm, see NOTE 1) and followed by a "-" and any other specific information if needed afterwards. |
|---|---|---|

As indicated in Table 2, the user agent parameter may contain information that identifies the NF instance, such as the NF instance ID. SCP 101A may extract the NF instance ID from the user agent header of the SBI request message (i.e., the service access request for delegated discovery or the service request message for non-delegated discovery) and use that information to populate the NF instance ID attribute of the access token request message. Similarly, the NF type may also be obtained from the user agent header of the SBI request message.

Returning to Table 1, the requester PLMN of the access token request may be populated based on a configured requester PLMN parameter of SCP 101A. The target PLMN attribute may be populated from the API name extracted from the requester uniform resource identifier (R-URI) of the SBI request message. The scope attribute of the access token request may be populated from the service name extracted from the R-URI of the SBI request message.

Returning to FIG. 7B, once the access token request is formulated, in step 702B, SCP 101A transmits the access token request to the NRF. For example, SCP 101A may transmit the access token request message to NRF 1008 located in the PLMN where the producer NF is located.

In step 702C, the process includes receiving the access token response including the access token from the NRF. For example, SCP 101A may receive the access token response including the access token from NRF 100B.

Returning to FIG. 7A, in step 704, the process includes using the access token to enable the consumer NF to access the service provided by the producer NF. FIG. 7C illustrates additional details of step 704 in FIG. 7A. Referring to FIG. 7C, the process differs slightly depending on whether delegated or non-delegated discovery was performed. If delegated discovery was performed, control proceeds to step 704A1, where the process includes generating an SBI service request message in response to the previously received service access request and inserting the access token obtained on behalf of the consumer NF in step 702 into the SBI service request message. For example, SCP 101A may generate an SBI service request directed to the producer NF identified in the delegated discovery procedure and insert the access token that it obtained from NRF 100B in the SBI service request message. In step 704B1, the process includes forwarding the SBI service request including the access token to the producer NF. For example, SCP 101A may forward the SBI service request including the access token to the producer NF identified in the delegated discovery procedure. The producer NF will then authorize the service request using the access token and respond to the service request. SCP 101A will forward the response to the consumer NF 200 that sent the service access request.

If delegated discovery is not implemented, control proceeds to step 704A2 where SCP 101A inserts the access token into the previously received SBI service request. The message flow for the non-delegated discovery case is similar to that illustrated in FIG. 4 except that in line 1, the message that is received is an SBI service request rather than an SBI service access request and discovery has already been performed. The delegated discovery messaging in line 2 of FIG. 4 is not needed. The remaining steps for the non-delegated discovery case are the same as those illustrated in FIG. 4. Accordingly, in step 704B2, SCP 101A forwards the SBI service request including the access token to the producer NF. When SCP 101A receives the response from the producer NF, SCP 101A forwards the response to the consumer NF. Thus, FIGS. 7A-7C illustrate delegated authorization by an SCP where the SCP functions as an access token authorization client proxy, which, in the examples described herein, is an OAuth 2.0 authorization client proxy.

Figure 8A:
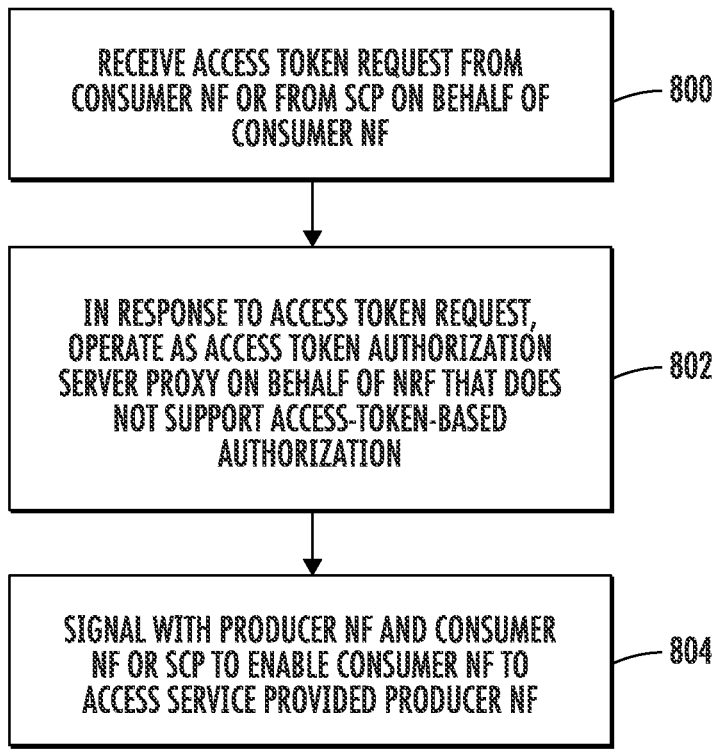
FIG. 8A is a flow chart illustrating an exemplary process for operating as an OAuth 2.0 authorization server proxy on behalf of an NRF that does not support OAuth 2.0 authorization and facilitating access to a service when a consumer NF supports OAuth 2.0 authorization and a producer NF does not support OAuth 2.0 authorization.

FIG. 8A illustrates an exemplary delegated authorization process performed by an SCP that functions as an access token authorization server proxy on behalf of an NRF that does not support access-token-based authorization. Referring to FIG. 8A, the process includes, in step 800, receiving an access token request from a consumer NF for the case of non-delegated discovery or from a remote SCP on behalf of a consumer NF in the case of delegated discovery. For example, SCP 101A may receive an access token request from consumer NF 300 in the case of non-delegated discovery (see FIG. 5A) or from SCP 101B in the case of delegated discovery (see FIG. 5B).

Figure 8B:
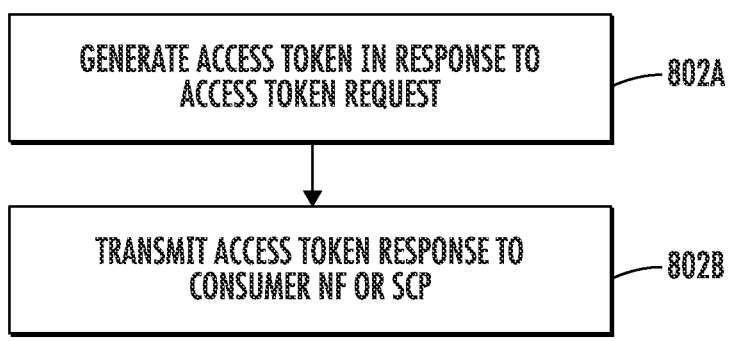
FIG. 8B is a flow chart illustrating in more detail the step from FIG. 8A of operating as an OAuth 2.0 authorization server proxy on behalf of an NRF that does not support OAuth 2.0 authorization.

In step 802, the process includes, in response to the access token request, operating as an access token authorization server proxy on behalf of the NRF that does not support access-token-based authorization. Step 802 is illustrated in further detail in FIG. 8B. Referring to FIG. 8B, in step 802A, the process includes generating an access token in response to the access token request. For example, SCP 101A may generate an access token including the required claims specified in IETF RFC 6749. The access token may be syntactically correct according to the format and content specified in IETF RFC 6749. However, it is not necessary that the access token be a real access token and can be a dummy access token with syntactically correct fields because, as will be described below, SCP 101A will remove the access token from service request messages before forwarding the service request messages to the producer NF that doesn't support access-token-based authorization.

In step 802B, the process includes transmitting an access token response to the consumer NF or SCP. For example, SCP 101A may transmit the access token response that it generated in step 802A to the requesting consumer NF in the case of non-delegated discovery or to the remote SCP in the case of delegated discovery.

Figure 8C:
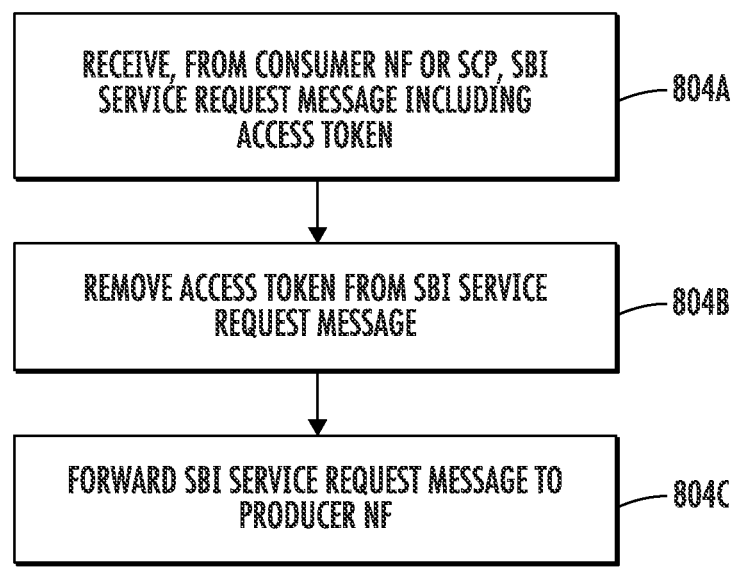
FIG. 8C is a flow chart illustrating in more detail the step from FIG. 8A of signaling with the producer NF and the consumer NF to enable the consumer NF to access the service provided by the producer NF when the consumer NF supports OAuth 2.0 authorization and the producer NF does not support OAuth 2.0 authorization.

Returning to FIG. 8A, in step 804, the process includes signaling with the producer NF and the consumer NF or SCP to enable the consumer NF to access the service. Step 804 is illustrated in more detail in FIG. 8C. Referring to FIG. 8C, the process of signaling with the producer NF and the consumer NF or SCP includes, in step 804A, receiving, from the consumer NF or SCP, an SBI service request including the access token. For example, SCP 101A may receive an SBI service request from NF service consumer 300 including the NF access token that SCP 101A generated (for the case of non-delegated discovery) or from SCP 101B for the case of delegated discovery.

In step 804B, the process includes removing the access token from the SBI service request. In step 804C, the process includes forwarding the SBI service request to the producer NF. For example, SCP 101A may remove the access token that it generated from the SBI service request and forward the SBI service request to the producer NF. Thus, FIGS. 8A-8C illustrate exemplary steps that may be performed by an SCP in functioning as an access token authorization server proxy and signaling intermediary on behalf of an NRF that does not support access token based authorization.

Exemplary advantages of the subject matter described herein include improved interoperability between PLMNs where one PLMN supports access token based authorization and another PLMN does not. Providing the solution at an SCP is beneficial, as an SCP handles messaging on behalf of plural consumer NFs. It is also a scalable solution as a single SCP can perform the functions described herein for or on behalf of consumer and producer NFs.

The disclosure of each of the following references is hereby incorporated herein by reference in its entirety.

REFERENCES

1. Hardt, D. "The OAuth 2.0 Authorization Framework," IETF RFC 6749 (October 2012).
2. 3GPP TS 33.501 V17.0.0 (2020 December), $3^{rd}$ Generation Partnership Project; Technical Specification Group Services and System Aspects; Security architecture and procedures for 5G system (Release 17).
3. 3GPP TS 29.500 V17.1.0 (2020 December); $3^{rd}$ Generation Partnership Project; Technical Specification Group Core Network and Terminals; 5G System; Technical Realization of the Service Based Architecture; Stage 3 (Release 17).
4. 3GPP TS 29.510 V17.0.0 (2020 December); $3^{rd}$ Generation Partnership Project; Technical Specification Group Core Network and Terminals; 5G System; Network Function Repository Services; Stage 3 (Release 17).
5. 3GPP TS 23.501 V16.7.0 (2020 December); $3^{rd}$ Generation Partnership Project; Technical Specification Group Services and System Aspects; System architecture for the 5G System (5GS); Stage 2 (Release 16).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for delegated authorization at a service communication proxy (SCP), the method comprising:
   at a first SCP including at least one processor and a memory:
      intercepting, by the first SCP, from a first consumer network function (NF) that does not support access-token-based authorization, a service based interface (SBI) request; operating, by the first SCP, as an access token authorization client proxy to obtain a first access token on behalf of the first consumer NF; using, by the first SCP, the first access token to enable the first consumer NF to access a service provided by a first producer NF that requires access-token-based authorization;
      receiving, by the first SCP and from a second consumer NF or a second SCP, an access token request;

operating, by the first SCP, as an access token authorization server proxy on behalf of an NF repository function (NRF) that does not support access token authorization in response to the access token request from the second consumer NF or the second SCP, wherein the NRF maintains service profiles of NF instances and identifies services supported by each NF instance; and signaling by the first SCP, with the second consumer NF or the second SCP and a second producer NF to enable the second consumer NF to access a service provided by the second producer NF.

2. The method of claim 1 wherein operating as an access token authorization client proxy includes signaling with an NRF that supports access token authorization to obtain the first access token.

3. The method of claim 2 wherein signaling with the NRF that supports access token authorization to obtain the first access token includes:
   generating an access token request on behalf of the first consumer NF;
   transmitting the access token request to the NRF that supports access token authorization; and
   receiving, from the NRF that supports access token authorization, an access token response including the first access token.

4. The method of claim 3 wherein generating the access token request includes extracting values for at least some attributes to be included in the access token request from a user agent header of the SBI request.

5. The method of claim 4 wherein extracting values for at least some of the attributes includes extracting an NF instance ID of the first consumer NF from the user agent header of the SBI request.

6. The method of claim 1 wherein receiving an SBI request includes receiving an SBI service request from the first consumer NF and wherein using the first access token to enable the first consumer NF to access the service provided by the first producer NF includes:
   inserting the first access token in the SBI service request;
   forwarding the SBI service request including the first access token to the first producer NF;
   receiving an SBI service response from the first producer NF; and
   forwarding the SBI service response to the first consumer NF.

7. The method of claim 1 wherein receiving an SBI request includes receiving an SBI service access request from the first consumer NF and wherein using the first access token to enable the first consumer NF to access the service provided by the first producer NF includes:
   generating an SBI service request based on delegated discovery and NF selection performed in response to the SBI service access request;
   inserting the first access token in the SBI service request;
   forwarding the SBI service request including the first access token to the first producer NF;
   receiving an SBI service response from the first producer NF; and
   forwarding the SBI service response to the first consumer NF.

8. The method of claim 1 wherein operating as an access token authorization server proxy comprises:
   generating, by the first SCP and in response to the access token request, a second access token; and
   transmitting, by the first SCP and to the second consumer NF or the second SCP, an access token response including the second access token.

9. The method of claim 1 wherein signaling with the second producer NF to enable the second consumer NF to access the service provided by the second producer NF includes:
   receiving, by the first SCP, and from the second consumer NF or the second SCP, a second SBI service request including the second access token;
   removing, by the first SCP, the second access token from the second SBI service request;
   forwarding, by the first SCP, the second SBI service request to the second producer NF;
   receiving, by the first SCP, an SBI service response from the second producer NF; and
   forwarding, by the first SCP, the SBI service response to the second consumer NF or the second SCP.

10. A system for delegated authorization at a service communication proxy (SCP), the system comprising:
    a first SCP including at least one processor and a memory;
    an access token authorization client proxy implemented by the at least one processor for intercepting, from a first consumer network function (NF) that does not support access-token-based authorization, a service based interface (SBI) request, operating as an access token authorization client to obtain a first access token on behalf of the first consumer NF, and using the first access token to enable the first consumer NF to access a service provided by a first producer NF that requires access-token-based authorization; and
    an access token authorization server proxy implemented by the at least one processor of the first SCP for receiving, from a second consumer NF or a second SCP, an access token request; operating as the access token authorization server proxy on behalf of an NF repository function (NRF) that does not support access token authorization in response to the access token request from the second consumer NF or the second SCP, wherein the NRF maintains service profiles of NF instances and identifies services supported by each NF instance; and signaling with the second consumer NF or the second SCP and a second producer NF to enable the second consumer NF to access a service provided by the second producer NF.

11. The system of claim 10 wherein the access token authorization client proxy is configured to signal with NRF that supports access token authorization to obtain the first access token.

12. The system of claim 11 wherein the access token authorization client proxy is configured to signal with the NRF that supports access token authorization to obtain the first access token by:
    generating an access token request on behalf of the first consumer NF;
    transmitting the access token request to the NRF that supports access token authorization; and
    receiving, from the NRF that supports access token authorization, an access token response including the first access token.

13. The system of claim 12 wherein the access token authorization client proxy is configured to generate the access token request by extracting values for at least some attributes to be included in the access token request from a user agent header of the SBI request.

14. The system of claim 13 wherein the values extracted by the access token authorization client proxy include an NF instance ID of the first consumer NF from the user agent header of the SBI request.

15. The system of claim 10 wherein the SBI request includes an SBI service request and the access token authorization client proxy is configured to use the first access token to enable the first consumer NF to access the service by:
   inserting the first access token in the SBI service request;
   forwarding the SBI service request including the first access token to the first producer NF;
   receiving an SBI service response from the first producer NF; and
   forwarding the SBI service response to the first consumer NF.

16. The system of claim 10 wherein the SBI request includes an SBI service access request from the first consumer NF and the access token authorization client proxy is configured to use the first access token to enable the first consumer NF to access the service provided by the first producer NF by:
   generating an SBI service request based on delegated discovery and NF selection performed in response to the SBI service access request;
   inserting the first access token in the SBI service request;
   forwarding the SBI service request including the first access token to the first producer NF;
   receiving an SBI service response from the first producer NF; and
   forwarding the SBI service response to the first consumer NF.

17. The system of claim 10 wherein, in operating as the access token authorization server, the access token authorization server proxy is configured to:
   generate, in response to the access token request, a second access token; and
   transmit, to the second consumer NF or the second SCP, an access token response including the second access token, and wherein the access token authorization server proxy is configured to signal with the second consumer NF or the second SCP and the second producer NF to enable the second consumer NF to access the service provided by the second producer NF by:
   receiving, from the second consumer NF or the second SCP, a second SBI service request including the second access token;
   removing the second access token from the second SBI service request;
   forwarding the SBI service request to the second producer NF;
   receiving an SBI service response from the second producer NF; and
   forwarding the SBI service response to the second consumer NF.

18. A non-transitory computer readable medium having stored thereon executable instructions that when executed by a processor of a computer for delegated authorization at a service communication proxy (SCP), controls the computer to perform steps comprising:
   intercepting, by a first SCP, from a first consumer network function (NF) that does not support access token based authorization, a service based interface (SBI) request;
   operating, by the first SCP, as an access token authorization client proxy to obtain a first access token on behalf of the first consumer NF; using, by the first SCP, the first access token to enable the consumer NF to access a service provided by a first producer NF that requires access-token-based authorization;
   receiving by the first SCP and from a second consumer NF or a second SCP, an access token request:
   operating, by the first SCP, as an access token authorization server proxy on behalf of an NF repository function (NRF) that does not support access token authorization in response to the access token request from the second consumer NF or the second SCP, wherein the NRF maintains service profiles of NF instances and identifies services supported by each NF instance; and
   signaling, by the first SCP, with the second consumer NF or the second SCP and a second producer NF to enable the second consumer NF to access a service provided by the second producer NF.

* * * * *

UNITED STATES PATENT AND TRADEMARK OFFICE
CERTIFICATE OF CORRECTION

PATENT NO. : 11,811,747 B2
APPLICATION NO. : 17/198815
DATED : November 7, 2023
INVENTOR(S) : Singh et al.

It is certified that error appears in the above-identified patent and that said Letters Patent is hereby corrected as shown below:

On the Title Page

Column 2, item [56], Line 3, delete "Proxv" and insert -- Proxy --, therefor.

On page 2, Column 1, item [56], Line 11, delete "(Unpubllshed" and insert -- (Unpublished, --, therefor.

In the Claims

In Column 18, Line 8, in Claim 9, delete "SCP," and insert -- SCP --, therefor.

Signed and Sealed this
Eleventh Day of June, 2024

Katherine Kelly Vidal
*Director of the United States Patent and Trademark Office*